United States Patent
Lægdsmand et al.

(10) Patent No.: US 11,772,985 B2
(45) Date of Patent: Oct. 3, 2023

(54) REINFORCEMENT LEARNING FOR H2S ABATEMENT

(71) Applicant: Grundfos Holding A/S, Bjerringbro (DK)

(72) Inventors: Mette Lægdsmand, Bjerringbro (DK); Nicolai Bæk Thomsen, Bjerringbro (DK); Alexander Engels Ryming, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 200 days.

(21) Appl. No.: 17/186,849

(22) Filed: Feb. 26, 2021

(65) Prior Publication Data

US 2021/0284551 A1    Sep. 16, 2021

(30) Foreign Application Priority Data

Feb. 27, 2020   (EP) ..................... 20159855

(51) Int. Cl.
| | |
|---|---|
| *C02F 1/00* | (2023.01) |
| *G06N 3/08* | (2023.01) |
| *C02F 1/68* | (2023.01) |
| *C02F 101/10* | (2006.01) |

(52) U.S. Cl.
CPC .............. *C02F 1/008* (2013.01); *G06N 3/08* (2013.01); *C02F 1/68* (2013.01); *C02F 2101/101* (2013.01); *C02F 2209/006* (2013.01)

(58) Field of Classification Search
None
See application file for complete search history.

(56) References Cited

U.S. PATENT DOCUMENTS

| | | | |
|---|---|---|---|
| 2007/0074758 A1 | 4/2007 | McQuade et al. | |
| 2019/0095792 A1* | 3/2019 | Kashinath | ................ G06N 3/08 |
| 2021/0231558 A1* | 7/2021 | Pavlichenko | ...... G01N 21/4738 |

FOREIGN PATENT DOCUMENTS

| | | |
|---|---|---|
| CN | 110451738 A | 11/2019 |
| DE | 102007054115 A1 | 5/2009 |

* cited by examiner

*Primary Examiner* — Richard C Gurtowski
(74) *Attorney, Agent, or Firm* — McGlew and Tuttle, P.C.

(57) ABSTRACT

A computer implemented method and a system abates the presence of sulphide (H2S(g), H2S(aq) or HS-(aq)) in a wastewater flowing in a specific wastewater network from an upstream pumping pit to a downstream pumping pit or manhole. The computer implemented method and a system includes dosing into the wastewater at a position upstream of the downstream pit or manhole a chemical for abatement of sulphide, determining by use of a sensor the concentration of sulphide at a position downstream of the position at which chemical is dosed into the wastewater, such as located in the downstream manhole. The amount of chemical dosed is determined by use of a general agent and a specific agent.

16 Claims, 11 Drawing Sheets

REINFORCEMENT LEARNING FOR H2S ABATEMENT

FIELD OF THE INVENTION

The present invention relates to a computer implemented method and a system for abating the presence of sulphide (H2S(g), H2S(aq) or HS-(aq)) in a wastewater flowing in a specific wastewater network from an upstream pumping pit to a downstream pumping pit or manhole. The invention comprises dosing into the wastewater at a position upstream of the downstream pit or manhole a chemical for abatement of H2S, determining by use of a sensor the concentration of sulphide at a position downstream of the position at which chemical is dosed into the wastewater, such as located in the downstream manhole. The amount of chemical dosed is determined by use of a general agent and a specific agent.

BACKGROUND OF THE INVENTION

Abatement of sulphide in wastewater in wastewater networks is today typically done in a feedback control mechanism taking into account the highest H2S peak determined by a sensor within a given timeframe. In such system, the dosing can be determined e.g. by the difference between an acceptable level and the actual level of sulphide measured in the pit. While this is a workable solution, if often results in overdosing.

An underlining problem of abatement of sulphide in wastewater network is that while some factors involved in formation of sulphide may be predictable, some factors, such as meteorology factors, peoples and factories amount of discharge of wastewater as well as the contents of the waste water may be a factor that occurs stochastic depending on the time scales used in observing such occurrences. Thereby, although tempting, devising an analytic model or even an empirical model mimicking the dynamical behaviour of a wastewater network with respect to load and occurrence of sulphide is often found not to be a viable option.

With the prosperity of supervised learning (SLAI), one could be tempted to apply to learn how to control the dosing of chemical into a wastewater network with the purpose of abating presence of sulphide. However, supervised learning does not lend itself well to this type of problem, where the algorithm/agent can impact the system. Furthermore, it is not possible to say that an action will always be good or bad, as it will depend on the context. Often it will not be a single action but a series of actions which will lead to a desired behaviour and suffers from the inherent problem of the need to be trained for it to provide acceptable predictions. Such training requires that the correct dosing strategy for different times is known. The correct dosing depends on easily measurable quantities (e.g. temperature, flow, retention time) and some that are difficult to measure (e.g. the amount and type of organic matter, chemical composition) and will be difficult if not practically impossible to predict from measurements.

Reinforcement learning (RL) will give a possibility to explore the behaviour of the waste water system and timewise slowly, over time, build the knowledge of this behaviour—as opposed to trying to understand the behaviour from historic data as in SL (supervised learning).

Reinforcement learning requires some training time where the system explores the real system, this training time is called exploration time. In wastewater network such training would result in that sulphide will be produced in concentration levels being unacceptable for a prolonged exploration time. Thus, while RL at a first glance appears as an, out of the box, workable solution, the practical implementation will provide unacceptable results at least during periods with a high degree of exploration.

DE 10 2007 054115 A1 discloses a method for reducing odor nuisance in effluent comprises determining the leading parameter hydrogen sulfide in the gas and/or liquid phase of an effluent line at at least two sites using hydrogen sulfide and/or sulfide analyzers and using the measured values for controlling the required addition amount of an effluent treatment agent.

Hence an improved method and system for abatement of sulphide and in particular a more efficient and/or reliable method and system would be advantageous.

OBJECT OF THE INVENTION

It is an object of the present invention to provide a method and system which is capable of determining the needed amounts of chemical to be dosed into a wastewater network to abate sulphide.

It is a further object of the present invention to provide an alternative to the prior art.

In particular, it may be seen as an object of the present invention to provide a method and system that solves the above mentioned problems of the prior art.

Further objects of the invention may be to provide optimal control of H2S in wastewater systems e.g. to reduce odour and/or toxic effects of H2S in waste water systems while minimizing the required added chemicals, so as to reduce cost of chemical. Further, it may be an object to reduce degradation of the wastewater network's elements such as pipes so as to reduce cost related to e.g. corrosion of such elements.

SUMMARY OF THE INVENTION

Thus, the above described object(s) and several other objects are intended to be obtained in a first aspect of the invention by providing a method for abating the presence of sulphide (H2S(g), H2S(aq) or HS-(aq)) in a wastewater flowing in a specific wastewater network from an upstream pumping pit to a downstream pumping pit or manhole wherein the specific wastewater network being an existing or planned physical realization of a wastewater network, the method comprising
   preferably, providing the specific wastewater network comprising the upstream pit and the downstream pit or manhole;
   preferably, providing a dosing unit configured for dosing a chemical capable of sulphide abatement upstream of the downstream pit or manhole;
   preferably, providing a sensor downstream of the dosing unit, said sensor being capable of measure concentration of sulphide and provide a readout indicative of the sulphide concentration in a region surrounding the sensor;
   preferably, providing a control unit configured for providing the dosing unit with a dosing signal and for receiving as input the readout from the sensor;
   dosing into the wastewater at a position upstream of the downstream pit or manhole said chemical for abatement of sulphide, and
   determining by use of a sensor the concentration of sulphide at a position downstream of the position at which chemical is dosed into the wastewater, such as located in the downstream manhole;

wherein the amount dosed of said chemical for abatement of sulphide is determined by a general agent and training the general agent by reinforcement learning, to determine a dosing amount of chemical on the basis of a concentration of sulphide, the training of the general agent is based on numerical simulations of a plurality of real wastewater networks, and/or:

training the/a general agent by reinforcement learning, on a numerical simulation of a/said specific wastewater network to determine a dosing amount of chemical on the basis of a concentration of sulphide;

deploying the general agent to determine amounts of said chemical for abatement of sulphide to be dosed into said specific wastewater network and dosing the determined amounts of chemical into the specific wastewater network, wherein the deployment and dosing comprising training by reinforcement learning the general agent, to obtain a specific trained agent, wherein the reinforcement learning comprising:

initially, determining by use of the general agent an amount of said chemical for abatement of sulphide to be dosed on the basis of a determined concentration of sulphide in the specific wastewater network, dosing the determined amount into the wastewater, and after dosing of said chemical determining the concentration of sulphide in the specific wastewater system and provide a reinforcement learning to the general agent to obtain the specific trained agent;

subsequently, preferably repeatedly, determining by use of the specific trained agent an amount of said chemical for abatement of sulphide to be dosed on the basis of a determined concentration of sulphide in the specific wastewater network, dosing the determined amount into the wastewater, and after dosing said chemical determining the concentration of sulphide in the specific wastewater system further train the specific trained agent.

The invention resides inter alia in that chemical substances are formed in and/or released e.g. as gas from wastewater during transport towards e.g. a wastewater treatment facility. This is due to the presence in the wastewater of chemical and biological reactants and microorganisms that may interact to form other chemical substances or be released from the wastewater e.g. to form a gas or other volatile substances evaporating from the wastewater.

The method according to the invention is typically a computer implemented method.

A real wastewater network preferably refers an existing or designed physical realization of a wastewater network.

Accordingly, Load as used herein in connection with wastewater is used to reference an amount present in the wastewater, before dosing of chemical, of reactants and/or biological microorganisms that may interact to form sulphide.

Agent as used herein is use to reference an software implemented algorithm, such as an intelligent algorithm, such as an RA agent which may be trained using various algorithms such as Q-learning, actor-critique etc. The agent may be capable of based on input of sulphide provide an output representing an amount of chemical, typically for the dosing unit. Agent may also refer to an autonomous numerical entity which acts, directing its activity towards achieving goals, upon a wastewater network using observation through H2S sensor and consequent dosing unit. A general agent may be considered to be an agent which is trained on one or more wastewater networks preferably by numerical simulations of wastewater network(s). An agent may be seen as taking as input an observation to decide an action (determine amount of chemical to be dosed to abate sulphide). The observation may beside the determined concentration of sulphide, comprise the volume flow of wastewater (preferably measured at the dosing unit) and/or the previous dosed value(s). In addition or alternatively, the observation may also include what time of day and week the action is made (represented by a scalar value). In preferred embodiments, all of these are "fed into" the agent with the past X (X being a predefined number of days) days of values for each signal.

Accordingly, and preferably, if as a non-limiting illustrative example an action is to be taken at every $6^{th}$ hour, a historic window 4 days is used, each input would be 4 day*4 values/day=16 values.

This procedure can be used during training and during a use of the agent, where the agent is not trained. A training may be implemented as: with some preselected intervals, e.g. each week, such as after 4*7=28 actions, the agent is trained (e.g. optimizing a neural network as in supervised learning) based on all/or some of the most recent (e.g. past year) historic experience. The training may be stopped, when it is realized that that the agent is doing a good job in production.

Some preferred embodiments may be disclosed as: reinforcement learning has the potential to learn how to make actions (a policy) purely from data, with the downside of this requiring access to the task that must be learned, i.e., the algorithm (agent/controller) must be able to interact with the system by trying out different actions when different observations are obtained. When learning on a real physical system this can potentially take a long time, which is unacceptable in most applications. The invention proposes a learning strategy for combining learning in a simulated environment and the real deployment system (environment). In accordance herewith, the invention propose to divide the learning into three steps:

1. A general agent (denoted agent A) is trained from scratch to dose on P (a number of) simulated wastewater networks. These P networks may resemble real wastewater networks. The wording "resemble" is here used to indicate that wastewater networks are simulated 2. Given some information (number of dimensions, houses connected etc.) about the target (specific) wastewater network a simulation (simulated environment) can be constructed. Using this simulated environment, agent A can be trained further on this environment to gain more knowledge/skills about the target (specific) wastewater network. This new agent is denoted general agent B.

3. In this step, general agent B is deployed to the target (specific) environment and acquire more knowledge thus getting better.

By starting out with a general agent and deploying this general agent on a specific wastewater network dosing of chemical may from the beginning be done in a way abating at least to some extend the presence of sulphide. Further, as the general agent may already trained on a wastewater network, although simulated, the exploration time for the specific agent may be dramatically reduced.

The use of an agent may furthermore provide the effect that as the training of the specific agent can be continued as long as desired or invoked when desired changes imposed into the wastewater network, it does not demand any changes in the method according to the invention, since if the training is ongoing, the specific agent will automatically adapt to the changes. Such automatically adaptation may be accomplished by the inherent feature of the agent to explore other solutions whereby changes will be found by the agent during such explorations. Similarly, if the training is invoked when changes are invoked into the wastewater treatment system, the specific agent will automatically adapt to the changes.

The specific agent may be viewed as used to predict future actions of dosing of chemical for abatement of sulphide (e.g. how to adjust a set-point for dosing) as of being deployed. In order to improve on the current policy dictated by the specific agent, the agent could sometimes choose to execute a different action, than the one predicted to be the best. This is called exploration. The proportion of times to choose an exploratory action is commonly determined by a probability (of taking an exploratory step) that starts high during initial learning and is then annealed towards a very low value after some fixed time or when some conditions are met.

Thus, in preferred embodiments of the method, the step of further training the specific agent may comprise of an exploratory element, where the specific agent executes a different amount of dosing of chemical to abate sulphide than what would have been determined by the specific agent. Preferably the proportion of times to choose an exploratory action is determined by a probability of taking an exploratory step that, preferably starts high during initial learning and is then annealed towards a very low value after some fixed time or when some, preferably predefined, conditions are met.

The wording "the agent execute" is used to distinguish the action from the otherwise "determined amount" which would be determined by the agent when not in exploration.

Training of the general agent may involve exploration, and in some embodiments, training of the general agent may comprising of an exploratory element, where the general agent executes a different amount of dosing of chemical to abate sulphide than what would have been determined by the general agent. Preferably the proportion of times to choose an exploratory action is determined by a probability of taking an exploratory step that, preferably starts high during initial learning and is then annealed towards a very low value after some fixed time or when some, preferably predefined, conditions are met.

In an embodiment, the reinforcement learning may comprise a reinforcement learning reward, preferably based on the negative absolute difference between a pre-selected level of sulphide concentration and an actual determination of sulphide concentration or based on the negative sum of estimated cost of H2S and the estimated cost of chemical.

Preferably, preselected levels of sulphide concentrations are considered in relation to abatement of sulphide, and the actual value or interval may be fixed as a level being acceptable for the wastewater network. Acceptable may result from a balance between smell, cost of degradation of pipe, e.g. estimated by considering cost of replacing the pipe and manhole and the effect of H2S on the life time of the pipes and manholes, or other parameters.

In an embodiment, the numerical simulation of a wastewater network system(s) may be based on the basis of a plurality of data sets from real dosing scenario(s) from wastewater network system(s).

In an embodiment, the determined concentration of sulphide may be a value timely averaged over a preselected time, such as over 5.0 minutes, such as over 10.0 minutes.

In an embodiment, the determined concentration of sulphide may be determined at preselected points in time, such as at regular intervals.

In an embodiment, the reinforcement learning of the specific trained agent (C) may be applied while the specific wastewater network is in service.

In an embodiment, the general agent (B) may be trained on the basis of simulations on at least some characteristics of the specific wastewater network, wherein the characteristics may include one or more of geometries of the networks system, expected timewise load exposure, expected quality, expected rain, specific information, such as houses connected, number of dimension etc., and policy from agents acting in other wastewater networks system(s).

In an embodiment, the further training may comprise reinforcement learning.

In an embodiment, the general agent (A, B) and the specific agent (C) may use a policy, for determining the best action given the state of the system and its surroundings, trained on Q learning, deep Q learning, model-based algorithms, actor-critique algorithm, federated learning or transfer_learning, the state of the system may be e.g. the H2S concentration history and flow history of the system, the time of the week, the rain in the area, the temperature of the waste water.

In an embodiment, the pre-selected level of sulphide concentration may be a concentration interval, such as 5.0±0.1 ppm, preferably 4.0±0.1 ppm, such as 3.0±0.1 ppm, and where in the reinforcement learning may comprise providing the specific agent (C) with a negative reward if a determined concentration of sulphide is outside the concentration interval.

In an embodiment, the pre-selected level of sulphide concentration may be a concentration value, such as 5.0 ppm, preferably 4.0 ppm, such as 3.0 ppm, and where in the reinforcement learning may comprise providing the specific agent (C) with a negative reward if a determined concentration of sulphide is larger or smaller than the concentration value.

In an embodiment, the chemical dosed may be iron in one of its common oxidation states, such as $Fe^{2+}$, $Fe^{3+}$ and/or $Fe^{6+}$, or $NO_3$.

Abate as used herein in connection with "abating the presence of sulphide", typically but not exclusively refers to reducing and even avoiding the amount of sulphide by formation of the sulphide or taking care of it after it has formed.

Wastewater as used herein is preferably used to reference, such as waste sources put into a sewer system and in particular put into a wastewater network according to the invention.

Fluid as used herein is used to reference a fluid in a gas or liquid phase.

Determination of concentration as used herein refers typically but not exclusively to e.g. a measurement provided by a sensor configured to measure the concentration of the selected chemical substance or a measurement of a concentration of a chemical substance indicative of the concentration of the selected chemical substance. In the latter case, the obtained concentration can be transformed e.g. by correlative relations into the concentration of the selected chemical substance.

Numerical simulation as used herein is typically a mathematical (numerical) model mimicking a wastewater network and/or a set of experimental data of concentrations of sulphide in a wastewater network and amount of chemical dosed in response concentrations of sulphide. The numerical simulation may, thus, be considered as utilizing the numerical model to perform a numerical simulation of a of a wastewater network. This may preferable also include interpolation of data from a plurality of data sets from real dosing scenarios from wastewater networks systems.

In a second aspect, the invention relates to a system for abating the presence of sulphide ($H_2S(g)$, $H_2S(aq)$ or $HS^-(aq)$) in a wastewater flowing in a specific wastewater network from an upstream pumping pit to a downstream pumping pit or manhole, the system may comprise
- an upstream manhole having an inlet for receiving wastewater,
- a downstream manhole having an outlet for discharging wastewater,
- a pumping main fluidicly connecting the upstream pumping pit with the downstream pumping pit or manhole,
- a pump arranged to pump wastewater from the upstream manhole to the downstream pumping pit or manhole through the pumping main, said pump may be configured to pump in response to receiving a pump control signal,
- a dosing unit configured for dosing chemical into pumping main upstream of the downstream pumping pit or manhole, said dosing unit may be configured to dose a specific amount in response to receiving a dosing control signal,
- a sensor arranged downstream of the position at which chemical may be dosed into the wastewater, such as located in the downstream pumping pit or manhole, said sensor provides a readout indicative of the sulphide concentration in a region surrounding the sensor,
- a control unit configured for providing the pump with a pump control signal, providing the dosing unit with a dosing control signal, and for receiving as input the readout from the sensor, said control unit is further configured to establishing and execute the specific trained agent (C) according to any of the preceding claims.

In a third aspect, the invention relates to a method for abating the presence of sulphide ($H_2S(g)$, $H_2S(aq)$ or $HS^-(aq)$) in a wastewater flowing in a specific wastewater network from an upstream pumping pit to a downstream pumping pit or manhole, the method may comprise
- dosing into the wastewater at a position upstream of the downstream pit or manhole a chemical for abatement of H2S,
- determining by use of a sensor the concentration of sulphide at a position downstream of the position at which chemical is dosed into the wastewater, such as located in the downstream manhole;
- wherein the amount of chemical dosed may be determined by
  - deploying a general agent (A or B) to determine amounts of chemical to be dosed into said specific wastewater network and dosing the determined amounts of chemical into the specific wastewater network, wherein the deployment and dosing may comprise
    - training by reinforcement learning the general agent (A, B), to obtain a specific trained agent (C), wherein the reinforcement learning may comprise:
      - initially, determining by use of the general agent (A, B) an amount of chemical to be dosed on the basis of determined concentration of sulphide in the specific wastewater network and dosing the determined amount into the wastewater, subsequently, establishing the specific trained agent (C) by determining the concentration of sulphide in the specific wastewater system and provide a reinforcement learning initially on the general trained agent (A, B) and subsequently to the specific trained agent (C).

In an embodiment, the general agent may be provided by:
- training a general agent by reinforcement learning (A), to determine a dosing amount of chemical on the basis of a concentration of sulphide, the training of the general agent (A) may be based on numerical simulations of a plurality of real wastewater networks, and/or:
- training the/a general agent (A) by reinforcement learning (B), on a numerical simulation of a specific wastewater network to determine a dosing amount of chemical on the basis of a concentration of sulphide.

In an embodiment, the method for abating the presence of sulphide ($H_2S(g)$, $H_2S(aq)$ or $HS^-(aq)$) in a wastewater flowing in a specific wastewater network from an upstream pumping pit to a downstream pumping pit or manhole, the method may comprise
- dosing into the wastewater at a position upstream of the downstream pit or manhole a chemical for abatement of H2S,
- determining by use of a sensor the concentration of sulphide at a position downstream of the position at which chemical is dosed into the wastewater, such as located in the downstream manhole;
- wherein the amount of chemical dosed may be determined by inputting the determined concentration of sulphide into a specific agent whereby the specific agent may provide an amount of chemical to the be dosed and dosing said amount into the wastewater network.

In an embodiment, the specific agent may be provided by training a general agent before being deployed on a specific wastewater network.

In an embodiment, the specific agent may be trained by being deployed on said specific wastewater network(s).

In an embodiment, the specific agent may be according to the first aspect.

In a further aspect, the invention relates to a computer program product being adapted to enable a computer system comprising at least one computer having data storage in connection therewith to carry out the method according to the first aspect, when the program is executed by a computer.

The individual aspects of the present invention may each be combined with any of the other aspects. These and other aspects of the invention will be apparent from the following description with reference to the described embodiments.

BRIEF DESCRIPTION OF THE FIGURES

The present invention and in particular preferred embodiments thereof will now be disclosed in greater details with reference to the accompanying figures. The figures show way of implementing the present invention and are not be construed as being limiting to other possible embodiments falling within the scope of the attached claim set.

DETAILED DESCRIPTION OF AN EMBODIMENT

Figure 1:
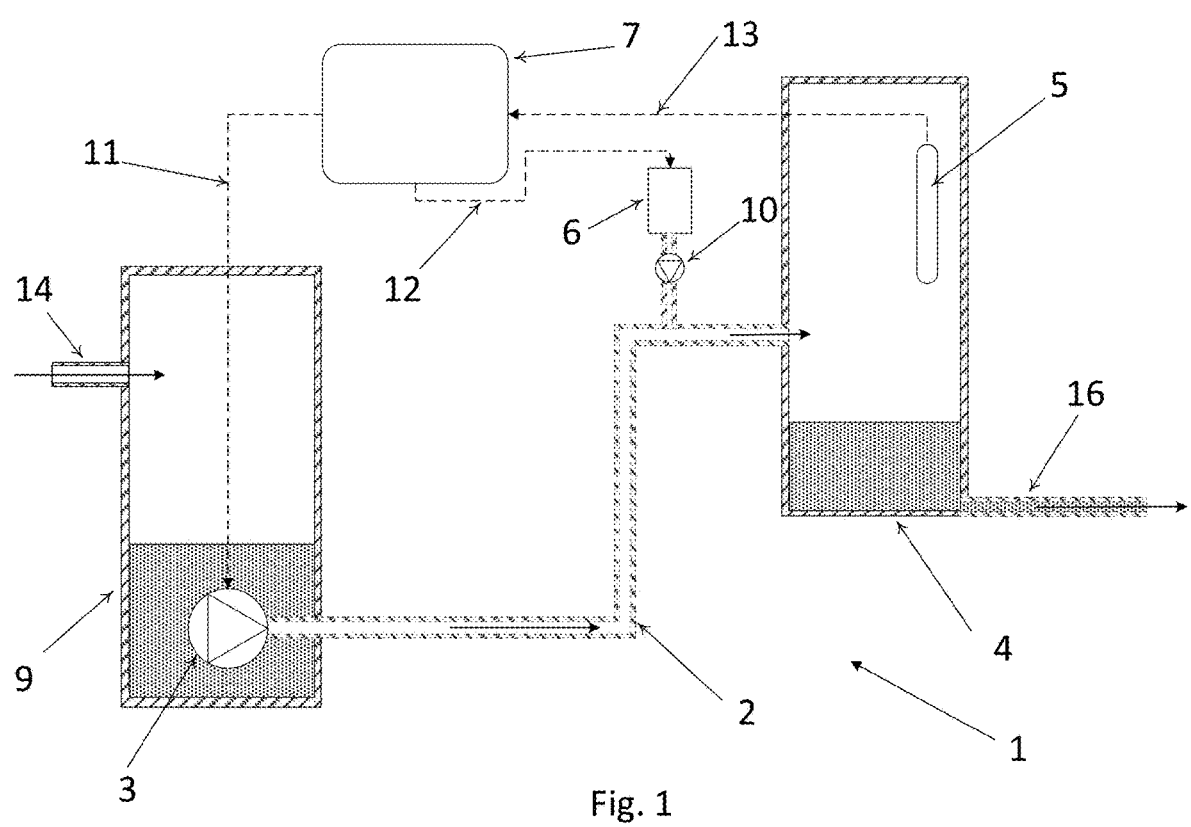
FIG. 1 schematically illustrates a wastewater network according to a preferred embodiment of the invention.

Reference is made to FIG. 1 schematically illustrates a wastewater network 1 according to a preferred embodiment of the invention. The figure shows various parts in cross sectional views. FIG. 1 is not drawn in a physical scale which is indicated e.g. by the pumping main being drawn with broken lines. As illustrated, the wastewater network 1 comprises an upstream pumping pit 9 inside which a pump 3 is arranged. The pumping pit 9 has an inlet 14 through which wastewater, such as sewage water is fed into the pumping pit 9. The grey shaded area inside the pumping pit 9 indicates the filling level of the pumping pit 9.

The upstream pumping pit 9 is fluidicly connected with a downstream manhole 4 (which may be a pumping pit) through a pumping main 2 which is a piping inside which wastewater fluid flows. The downstream manhole 4 comprises an outlet 16 through which wastewater can leave the manhole 4. Also in this case, the grey shading indicates the filling level in the manhole 4. The labelling upstream and downstream refers to the flow direction, which in the shown embodiment is from the pumping pit 9 to the manhole 4.

As presented herein, wastewater produces H2S if no measures are taken to avoid this. In the specific embodiment, a dosing unit 6 is fitted which by use of a pump 10 doses metered amounts of chemical to abate formation of H2S into the wastewater. The actual dosing position may be different from the position illustrated in FIG. 1, such as more upstream or downstream than illustrated or even positioned to dose into the sewage fluid inside the pumping pit 9.

The dosing of chemical and the control of the pump 3 (stop, start and pumping amounts) are controlled by a control unit 7. This is shown in FIG. 1 by dotted lines from the control unit 7 to the dosing unit 6 and the pump 3, which dotted lines illustrates control signals connections. As will be detailed below, the amount of chemical dosed resides, inter alia, in a determination of concentration of sulphide.

It has been found that a practical and efficient determination of concentration of sulphide can be carried out in the headspace inside the manhole 4. Accordingly, the wastewater network 1 according to the illustrated embodiment comprises a sulphide sensor 5 arranged in the headspace inside the manhole 4, and readouts from the sensor is fed into the control unit 7 through a data connection 13. The sensor 5 may alternatively be placed in liquid phase of the sewage.

The dosing of chemical utilizes a computer implemented method for abating the presence of sulphide (H2S(g), H2S (aq) or HS-(aq)) in a wastewater flowing in the specific wastewater network 1 illustrated in FIG. 1. The wastewater network 1 is labelled a specific wastewater system since it is an existing or planned physical realization of a wastewater network. As mentioned, the method comprises the steps of dosing into the wastewater at a position upstream of the downstream manhole 4 a chemical for the abatement of H2S, and determining by use of the sensor 5 the concentration of sulphide at a position downstream of the position at which chemical is dosed into the wastewater, such as located in the downstream manhole 4.

The amount of chemical dosed is determined by training a general agent A by reinforcement learning to determine a dosing amount of chemical on the basis of a concentration of sulphide. An agent is a software implemented algorithm for which details will be provided below. This agent is labelled "general agent" as it is not provided on the basis of being trained on a specific physical wastewater network, which may have physical deviations and imperfections. By general is preferably meant where data is not obtained in real-time and where the agent is not connected, learning or dosing to a real live operating wastewater network.

On the contrary, the training of the general agent A is, in some embodiments, based on a numerical simulation of a plurality of real wastewater networks. This plurality of wastewater network may be labelled "wastewater network resembling real wastewater network" as the real wastewater networks are simulated. These simulations are preferable based on dynamical equations, which could be based on data from wastewater network system, specific inflow profiles etc. Further, a range of data sources and computation techniques can be utilized in the simulation of the networks, such as real data from the network, such as a plurality of data sets from real dosing scenarios from wastewater networks, dynamical equations based on experimental data, theoretical considerations, knowledge about the systems etc. The general agent A is preferable trained on a plurality of wastewater networks, such that the agent is diversely trained and in some cases to avoid overfitting of the general agent A.

The general agent A may in some embodiments after this first training be trained to dose chemical to the wastewater network. This will advantageously remove the vast majority of the exploration time associated with reinforced learning when deploying the agent to a real system. The training is done on a plurality of wastewater networks in order for the general agent A to be trained to deal with a number of different scenarios and parameterizations and for the agent to be able to explore the vast majority of the "exploration space" associated with the wastewater networks.

In some embodiments, when the general agent A has been trained to be able to dose chemicals using simulated data from a number of wastewater networks, the agent is further trained on a specific simulation of a specific wastewater network. This will produce a more specific general agent, denoted general agent B, since it is preferable a trained agent A on a specific simulated wastewater network.

This specific wastewater network could have been part of the training material for general agent A, but may be a completely different wastewater network and/or a more specific simulation, where further information about the network system is included. The general idea is to train the general agent on the specific system it is to be deployed. By training material is preferably meant suitable parameterized and structured data for use in reinforcement learning in wastewater network.

This may reduce the exploration time further, when the general agent B is deployed to a real system. This simulated wastewater network is preferably based on attributes of a real wastewater network and can include all of the networks specifications, such as, number of dimensions, houses connected, etc.

This simulated wastewater network may therefore be as close to the real network as possible or desired and in order to create the simulation, a range of data sources and computation techniques can be utilized, such as real data from the network, dynamical equations based on experimental data, theoretical considerations, knowledge about the systems etc.

In some embodiments, the general agent (B) can also be trained straight from one specific simulated wastewater network, such that the general agent (A) is not used in order to provide the general agent (B).

The training of the general agent is in some embodiments carried out by training a general agent B by reinforcement learning to determine a dosing amount of chemical on the basis of a concentration of sulphide, the training of the general agent B is based on a plurality of data sets from real dosing scenarios from a specific wastewater networks, which may or may not form part of the simulation.

After the general agent A, B has been trained (preferably decided based on a preselected criteria such as the convergence of successive rewards, level of H2S or other preselected criteria), either from a plurality of networks and/or further on a specific wastewater network, the general agent A, B is deployed to be used in dosing chemical in the specific wastewater network such as the one disclosed in FIG. 1. The dissimilarities in between the different networks of the plurality of networks may be both on pipe network, load and quality, and timely distribution of those.

When the general agent A, B is deployed, an overall concept of the invention is that this general trained agent should be further trained based on the dynamics of the specific wastewater network 1, thereby becoming a specific trained agent C.

This training is typically done through reinforced learning, and the training may occur throughout the utilization of the agent C to determine chemical dosing to the wastewater network. The specific agent C is therefore specific to a physical, real, wastewater system, which means that the agent C is adapted to dynamics, quirks and imperfections of that specific system, which the simulation or training material may not have taken into account. Agent C therefore dose to the real wastewater system and learns from this.

Thus, after the general agent, which could either be agent A or agent B, has been provided, it is deployed to determine amounts of chemical to be dosed into specific wastewater network 1 and dosing the determined amounts of chemical into the specific wastewater network 1. In the specific embodiment shown in FIG. 1, the general agent is deployed into the control unit 7; however, the general agent may employed based a cloud based implementation. Once deployed, the general agent is subjected to reinforcement learning, learning from the real system, to obtain a specific trained agent C. The control unit 7 comprising at least one computer having data storage means in connection therewith and comprising program instructions which, when the program is executed by the computer, cause the computer to carry out steps of the method according to the invention.

At the very first instance of using the general agent A, B on the specific wastewater network 1, the general agent A, B is not yet trained on a specific, real wastewater network and the amount of chemical to be dosed is thus determined on the basis of determined concentration of sulphide in the specific wastewater network 1 and input this concentration into the general agent A, B and dosing the determined amount into the wastewater.

Subsequently, a state (concentration of sulphide) is obtained from the wastewater network by use of the sensor 6 and this state is used to establish the specific trained agent C by providing a reinforcement learning initially on the general trained agent A, B and subsequently to the specific trained agent C.

The reinforcement learning is implemented as a reinforcement learning reward routine based on the negative absolute difference between a pre-selected level of sulphide concentration and an actual determination of sulphide concentration. This is based on that in many implementations, the sulphide level is specified as a level and that an aim is to obtain a concentration level as close as possible to this level.

In another embodiment (which may be combined with the negative absolute difference embodiment) the reinforcement learning is based on the negative sum of estimated cost of H2S and the estimated cost of chemical. Cost of H2S may include two components cost of smell, cost of degradation of pipe, e.g. estimated by considering cost of replacing the pipe and manhole and the effect of H2S on the life time of the pipes and manholes.

Figure 2A:
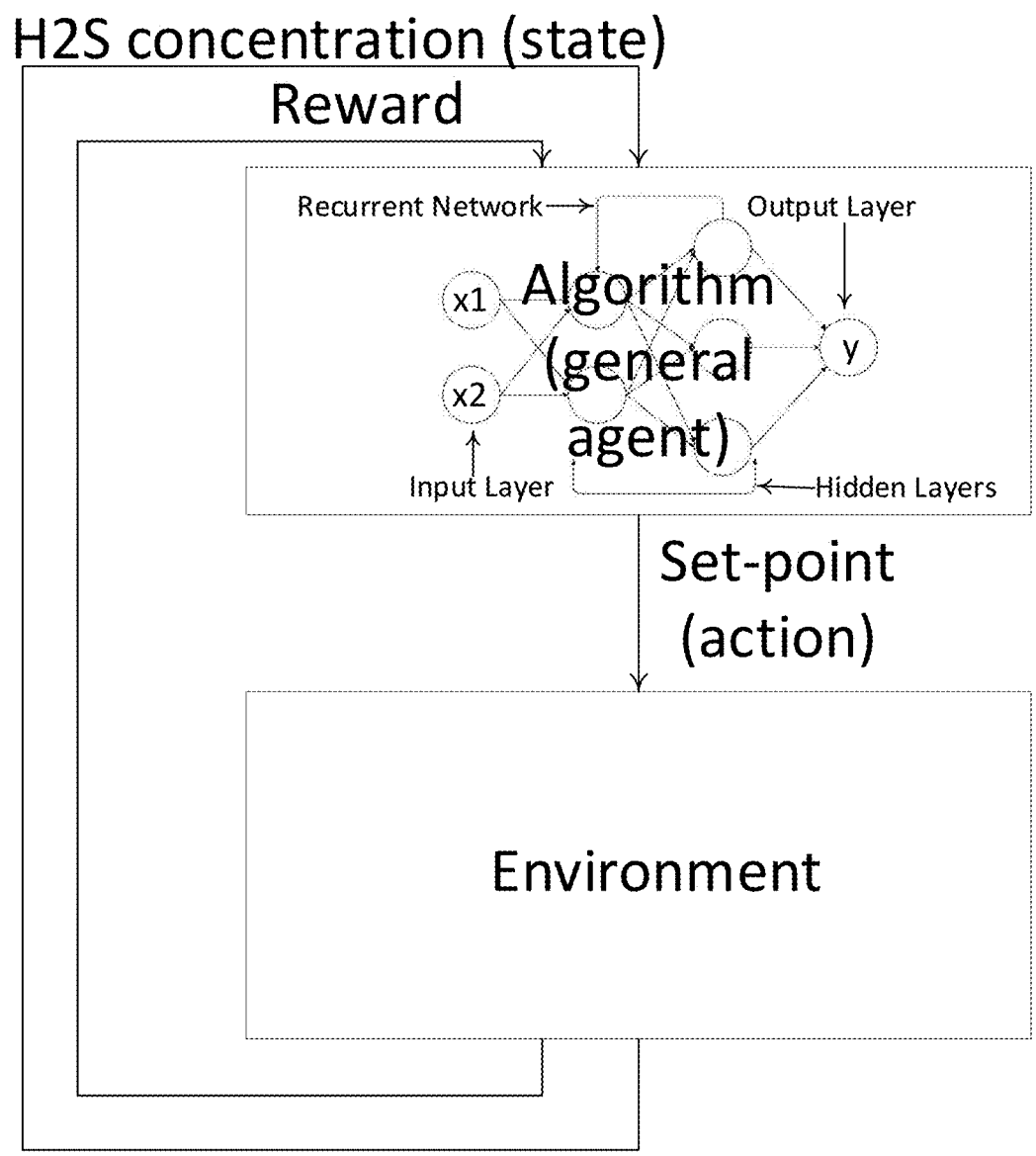
FIG. 2A schematically illustrates providing a general trained agent according to a preferred embodiment of the invention.

FIG. 2 schematically illustrates providing of the general agent, in this case agent B and the specific agent, here agent C. In FIG. 2A, the agent is referred to as an "Algorithm" and the numerical simulation as an "Environment". The numerical simulation is illustrated as a circuit. As illustrated, the algorithm provides an action, in this case a dosing amount, to be supplied to the environment. The environment, the numerical simulation, respond to this by a state, in this case a sulphide concentration. Based on the state, a reward is determined and the state together with the reward is supplied to the algorithm.

Figure 2B:
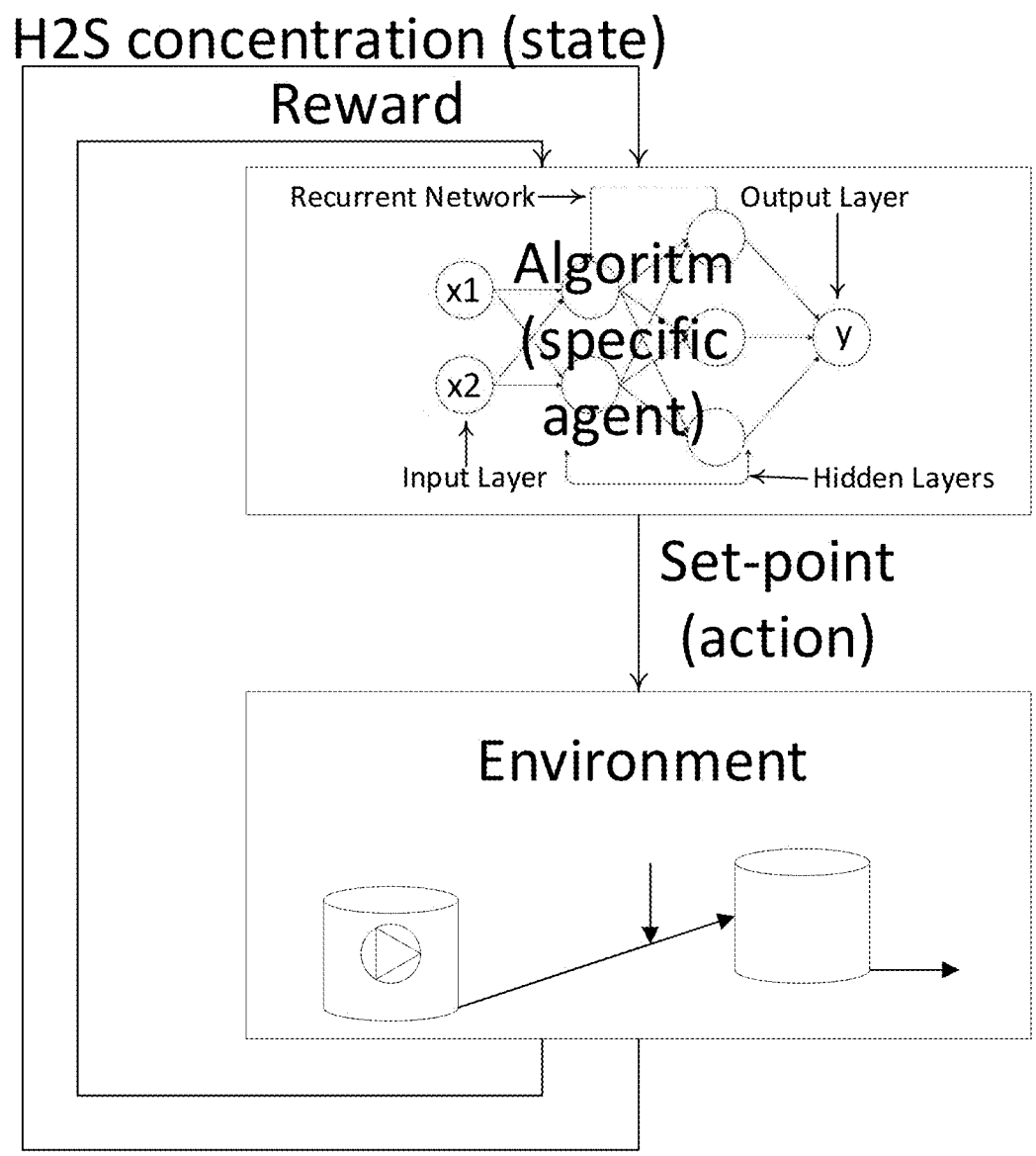
FIG. 2B schematically illustrates providing a specific trained agent according to a preferred embodiment of the invention.

In FIG. 2B, the general agent is deployed to the specific wastewater network. The Environment is schematically illustrated with elements recognizable from FIG. 1. The process of FIG. 2B is as in FIG. 2A except that now the reinforcement learning is based a real state (sulphide concentration) provided by the specific wastewater network 1.

In FIG. 2B, the general agent B has become the specific agent C and is determining dosing on a real wastewater, learning and adapting through reinforcement learning.

Figure 3A:
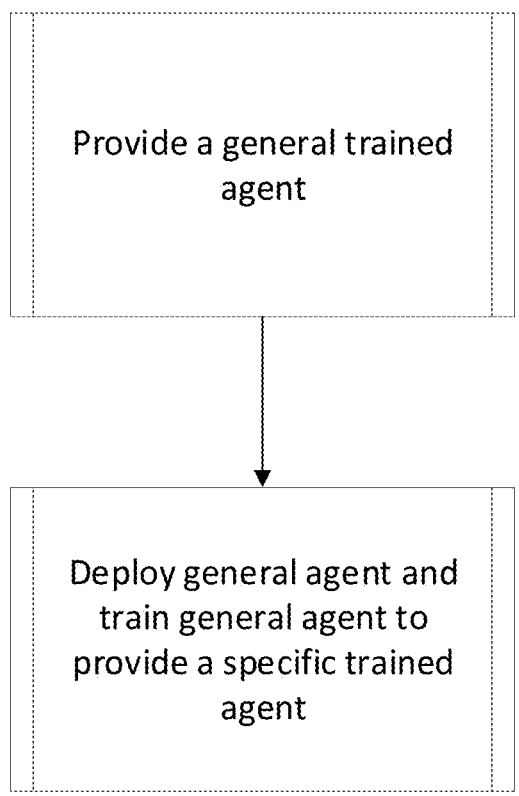
FIG. 3A is a flow chart schematically illustrating steps involved in establishing a specific trained agent according to a preferred embodiment of the invention, particularly two sub-processes, namely providing an general trained agent and the subsequent process of deploying the general trained agent and training the same.
Figure 3B:
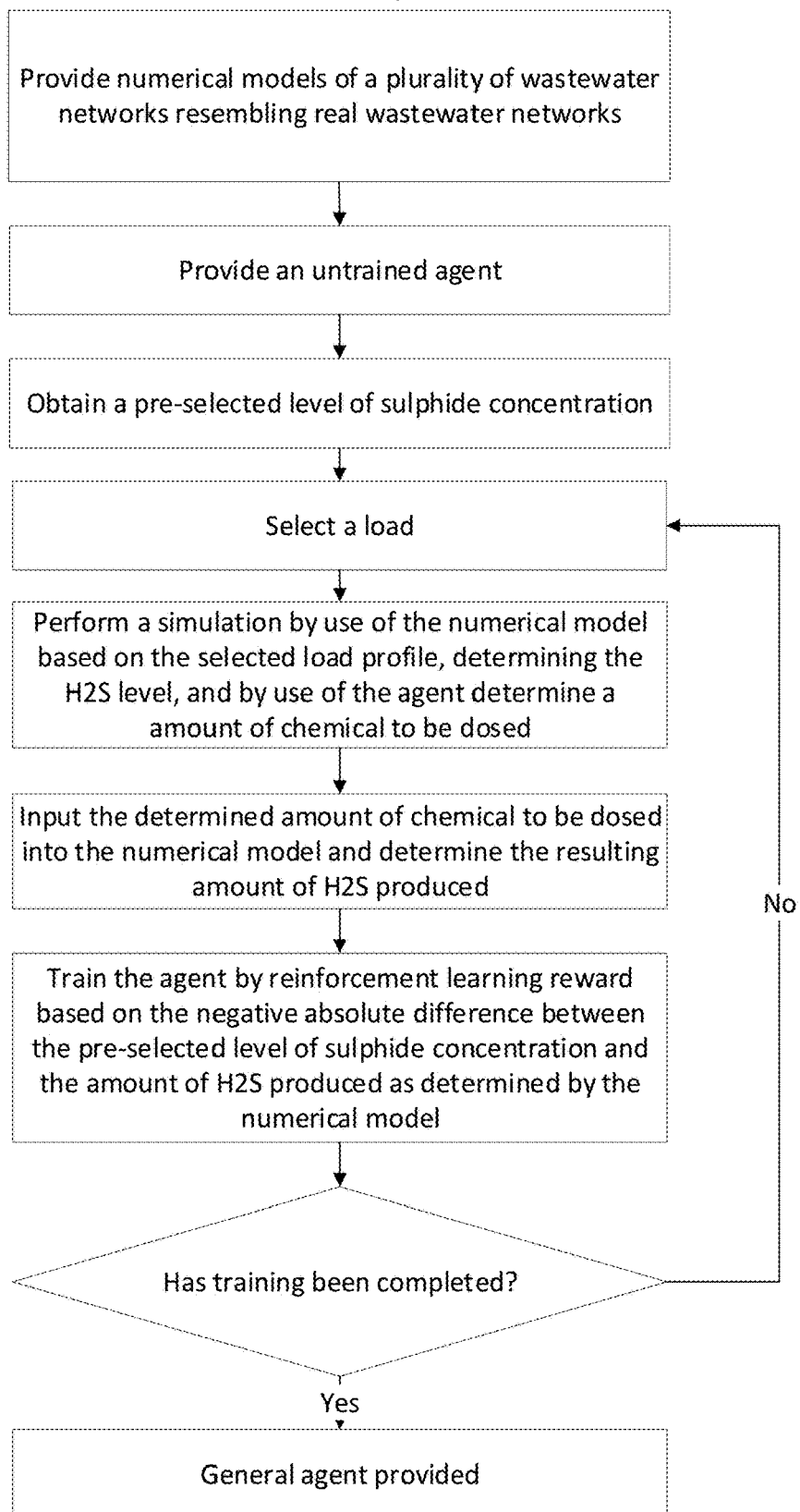
FIG. 3B is a flow chart schematically illustrating steps involved in establishing a specific trained agent according to a preferred embodiment of the invention with details of steps of the sub-process of providing an general trained agent.
Figure 3C:
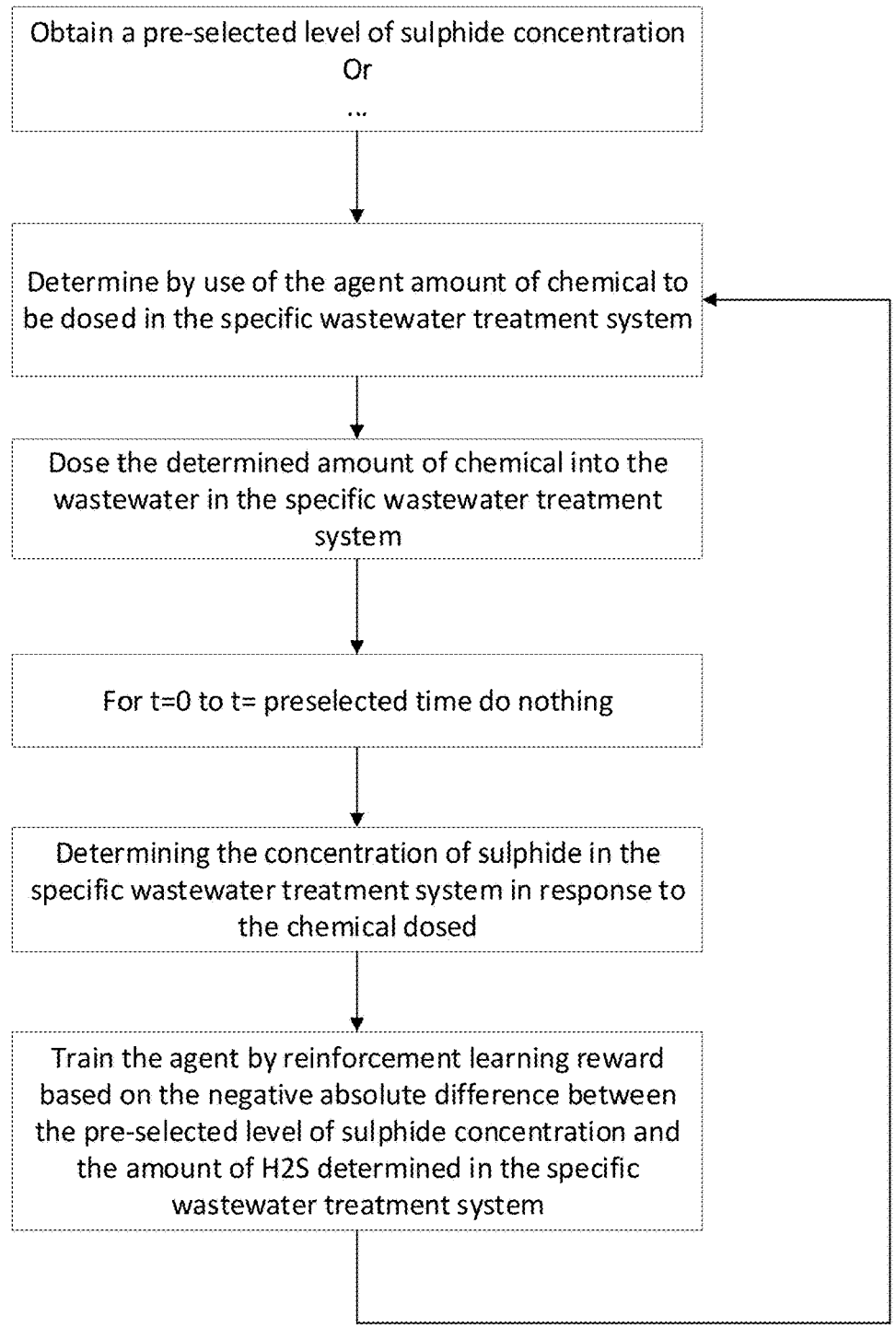
FIG. 3C is a flow chart schematically illustrating steps involved in establishing a specific trained agent according to a preferred embodiment of the invention with details of steps of the sub-process of deploying the general trained agent and training the same.

FIG. 3 is a flow chart schematically illustrating steps involved in establishing a specific trained agent according to a preferred embodiment of the invention. FIG. 3A illustrate two sub-processes, namely providing a general trained agent which corresponds to FIG. 2A and the subsequent process of deploying the general trained agent and training the same which corresponds to FIG. 2B.

FIGS. 3B and C each illustrates in greater details steps of the two sub-processes; Referring to FIG. 4, an example of training the general agent B from scratch is shown. In some embodiments, a general agent A is trained beforehand on a plurality of simulated wastewater networks.

Figure 4A:
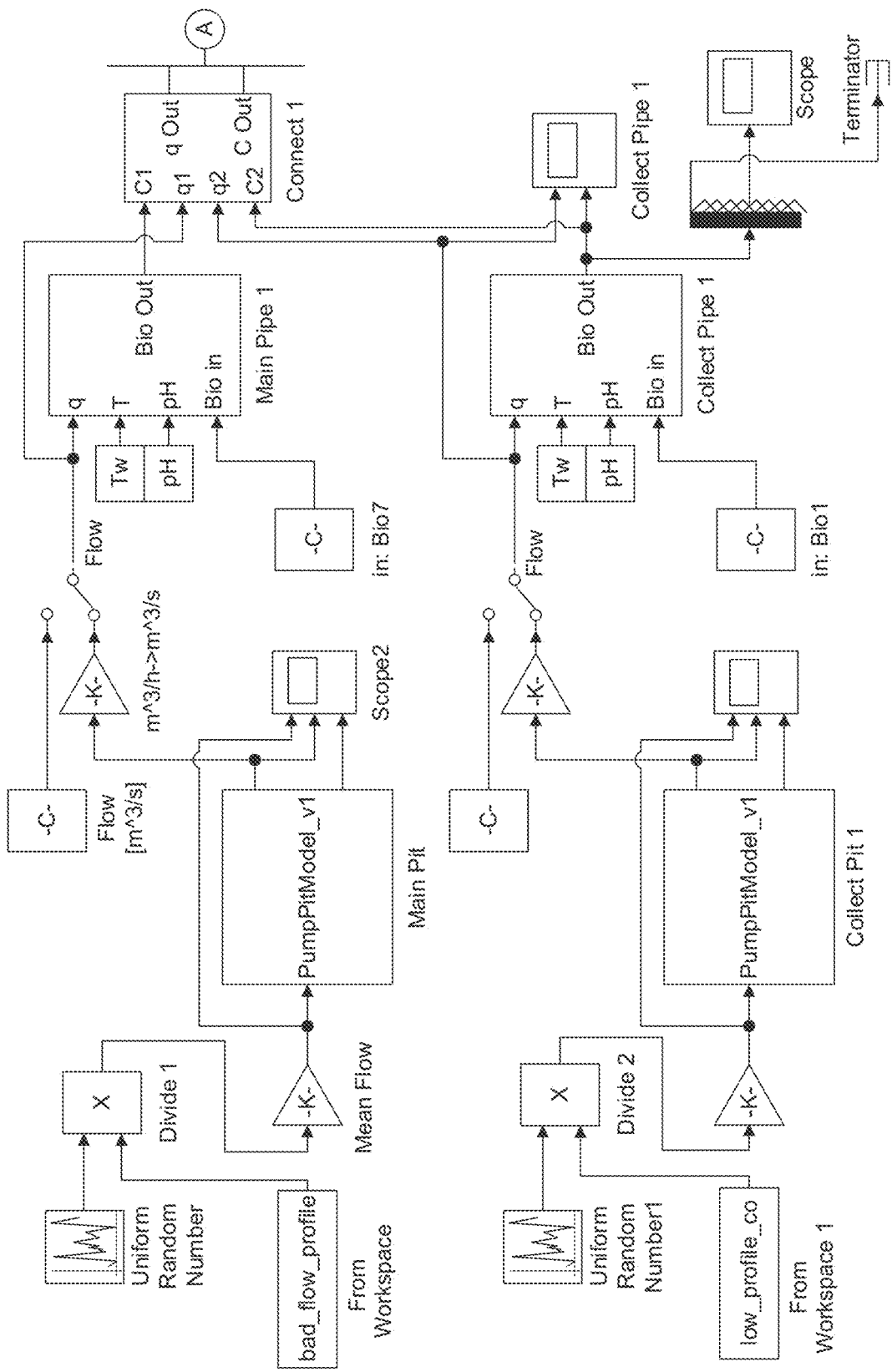
FIG. 4A shows an embodiment of the training of a general agent in an embodiment on a specific network. showing the network simulation tree.

The simulated wastewater network used in the training can be seen in FIG. 4a, which is based on dynamical equations and information about the specific system, which could, but is not limited to, data, dimension of pipes, location of measuring devices, houses connected, etc. The wastewater network has two pits (such as pits disclosed in connection with FIG. 1), with their in-flow profiles being created to have a non-constant, but repeating pattern with a small amount of added noise. The dosing is done at the end of the system, and the H2S level is measured 5 meters after dosing.

The agent can change the dosing level every $6^{th}$ hour and has three options, increase/decrease the dosing level by 0.0001, 0.0005, 0.001 absolute percentages or keep the current dosing. This gives the agent seven actions, which it can take.

The observation, which the agent must determine the actions from, consists of the systems state for the previous 16 cycles, where one cycle is 6 hours. The level H2S level is therefore measured every 6 hour. Thus, the agent has available 16*6=96 hours of the most recent history to base its decision on. The system state contains the following: Mean H2S level measured at output, Absolut H2S error relative to the desired H2S level, Dosing level, Time-indicator: the week is divided into 7*4=28 segments, so the agent knows whether it is Monday morning or Saturday afternoon.

The reward functions is given as the negative absolute difference between the desired H2S level and the measured average H2S level, thus the highest reward is 0. The agent was implemented using a recurrent neural network with 8 layers and a layer size of 32.

The agent is trained on 238 episodes, where each episode consists of 42 days, which equals 42*4=168 cycles/observations per episode, which yields a total of 238*168=39984 action/reward pairs to be trained on.

Figure 4B:
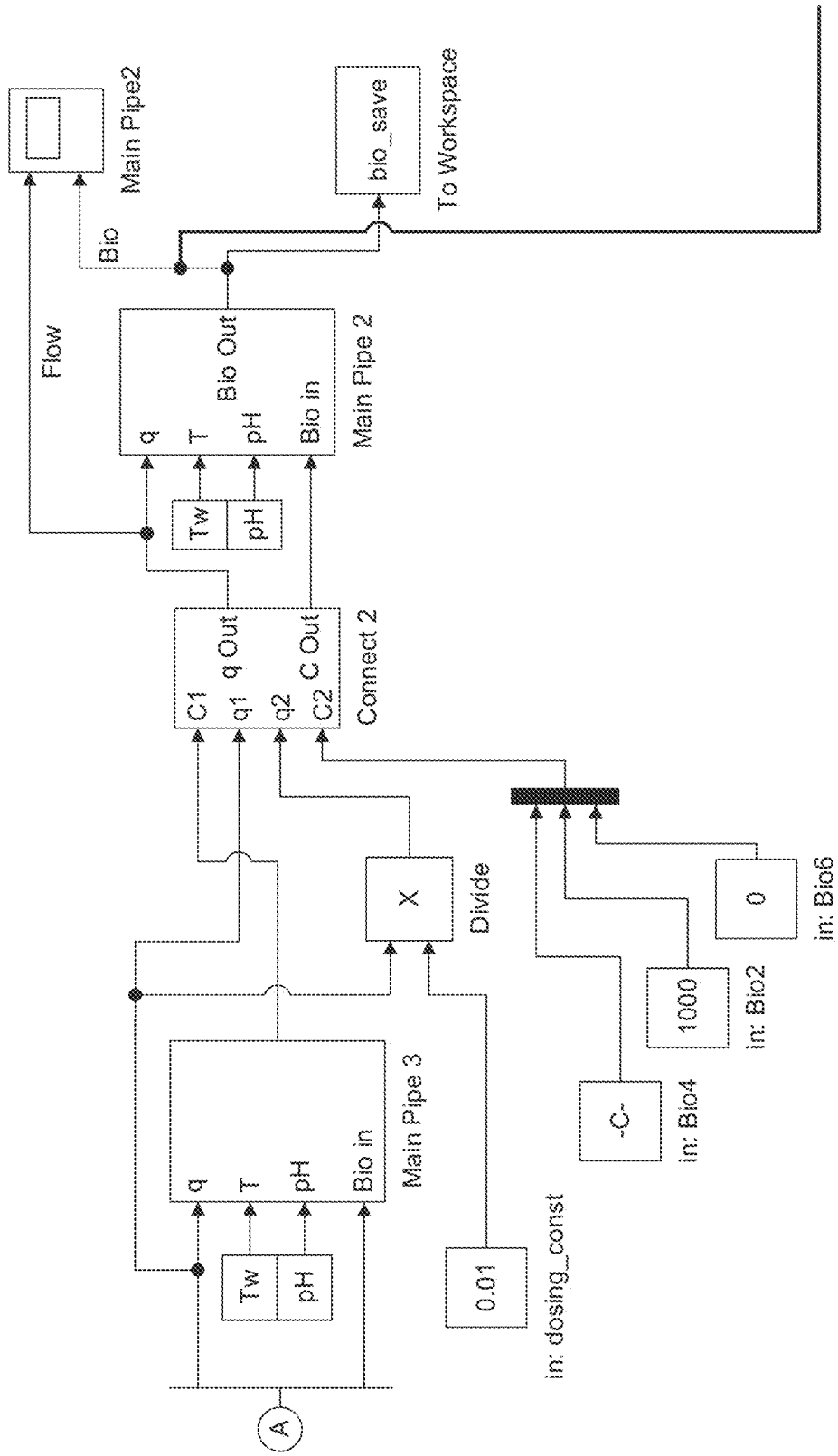
FIG. 4B is continuation of FIG. 4A.
Figure 4C:
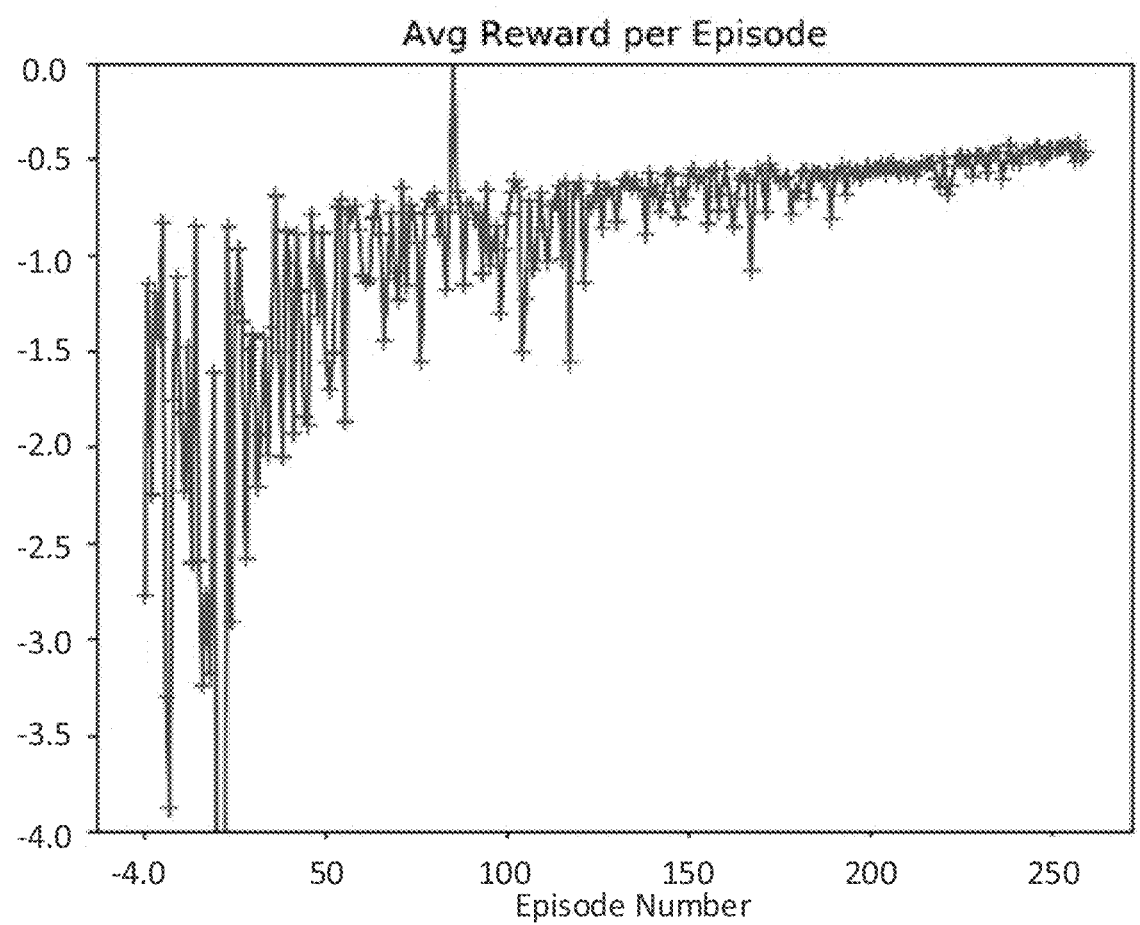
FIG. 4C is a graph showing the average reward as a function of episode number.
Figure 4D:
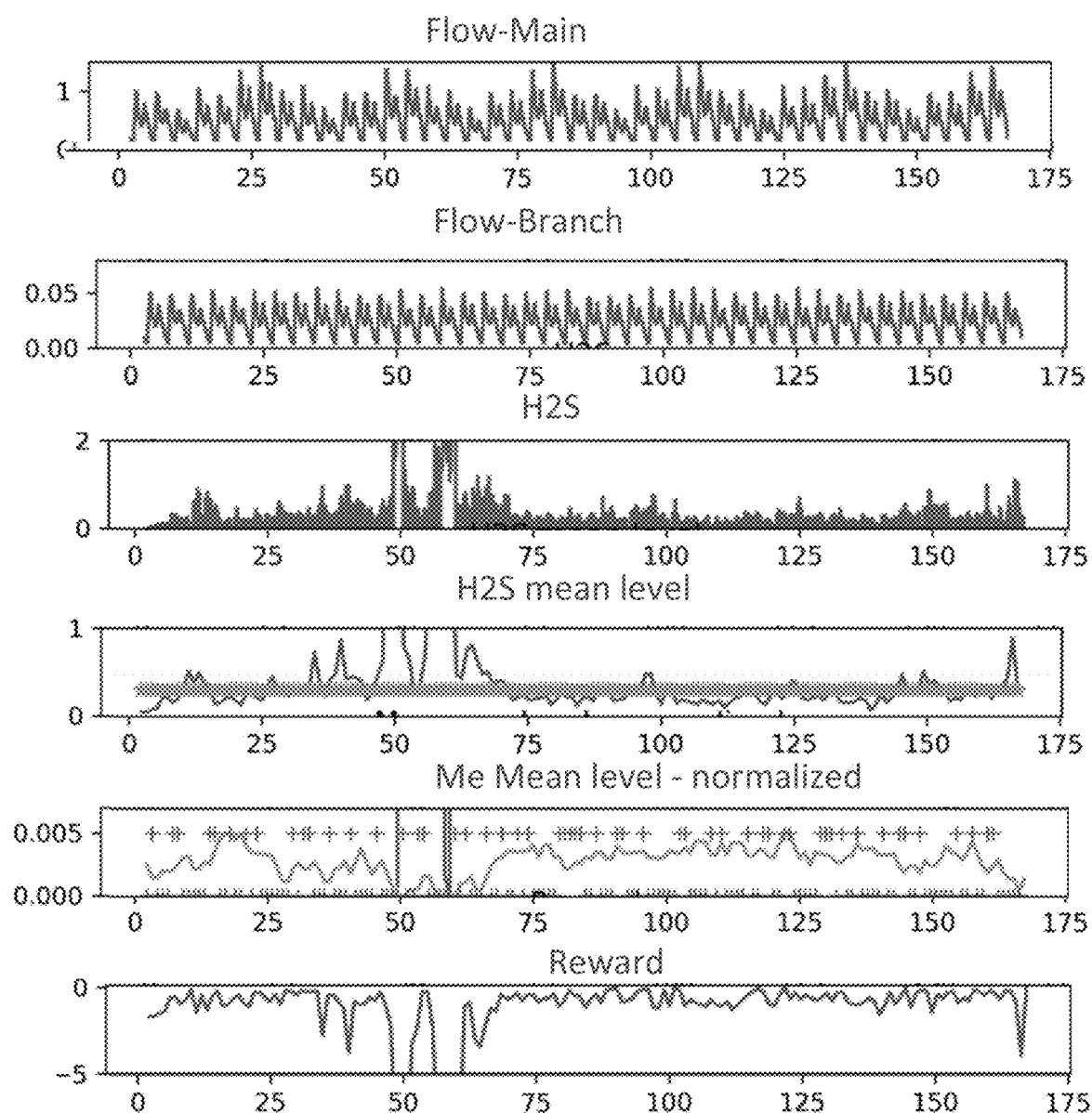
FIG. 4D is a graph showing data from an episode in the mid-range of the training of agent.
Figure 4E:
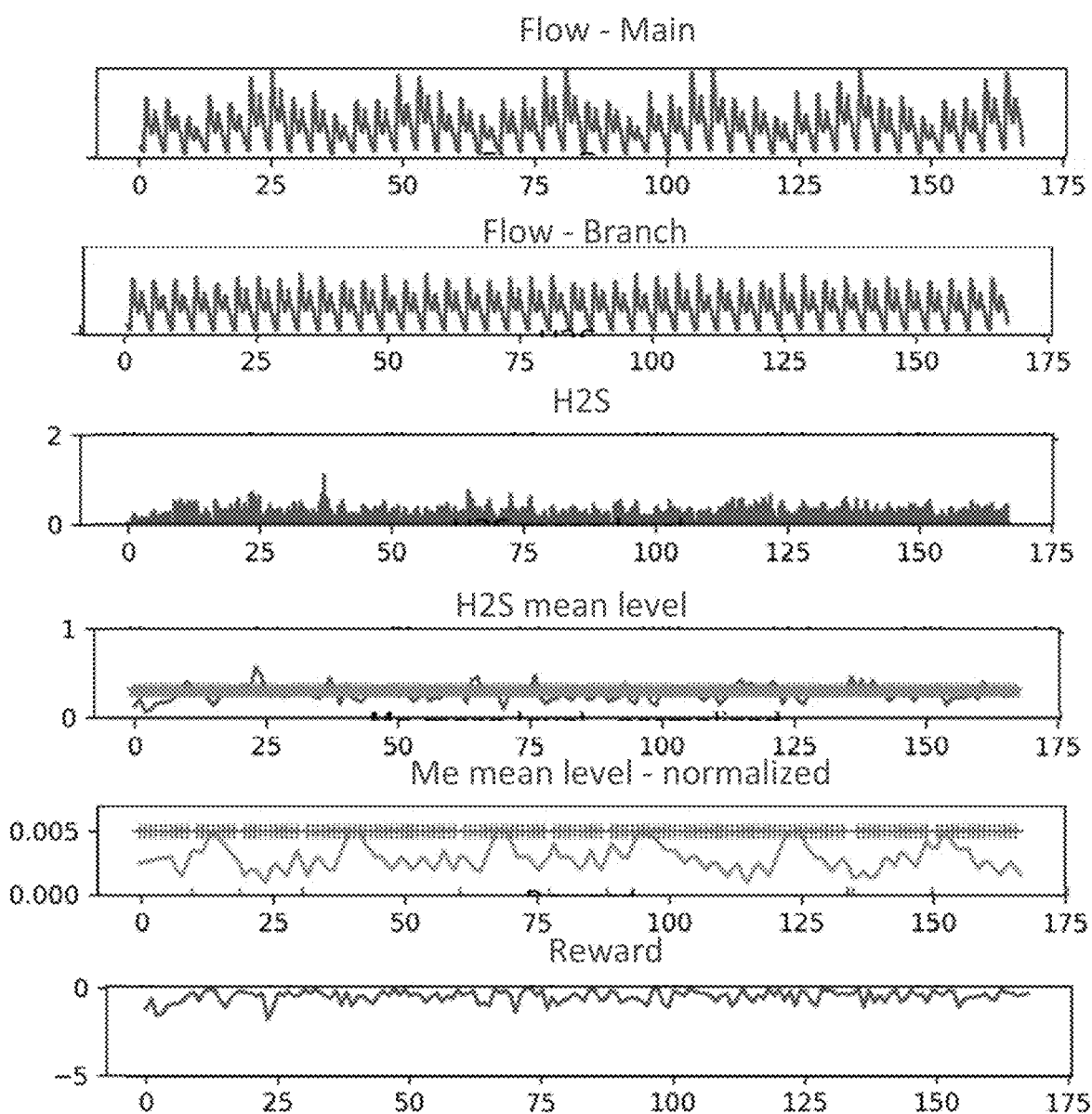
FIG. 4E is a graph showing data from the last episode of the training of the general agent.

The average reward per episode can be seen in FIG. 4*b*, which shows that the rewards, which is an indicator of the level of exploration of the algorithm, increases and converges towards a fixed high level. This indicates that optimal parameterization has occur by reinforcement learning.

To further examine the agent, episode 105 (approximately half-way training) and final episode, 260 is compared. These can respectively be seen in FIGS. 4*c* and 4*d*. The two top plots shows the inflow to the two pits over time. The two middle plots show the H2S level at 15 seconds and at 6 hours interval respectively, where the latter further contains a constant level indicator of the desired level of H2S. The two bottom plots show the dosing set point (reflects the chosen actions) and the reward, respectively.

By comparing the two plots from the bottom for both the episodes, it is seen that the agent learns how to adjust the dosing level in order to control the H2S level. Further, it is seen that the trained agent achieved a more desirable H2S level.

It is further observed that the training time is 39984*6=239904 hours, and an acceptable deviation is achieved after half that, at approximately 125000 hours or 5208 days. Training the agent on a real system would therefore produce unfavorable results for at least that period.

The trained general agent B can now be deployed to a real live wastewater network and used to dose chemicals, with a low exploration time.

Concentration levels when measured in e.g. the headspace may have a tendency to fluctuate rapidly rendering it ineffective to train the specific agent and determine the amount to be dosed based thereon. Thus, the determined concentration of sulphide used for training and determining the amount to be dosed may be a concentration value timely averaged over a preselected time, such as over 5.0 minutes, such as over 10.0 minutes or even longer, such as an over 1.0 hours, such as 2.0 hours, or even 3.0 hours. In a specific embodiment, peaks the 50 highest peaks of H2S occurring during a 6.0 hours' time window were averaged to provide the concentration to the agent.

While the invention has the capabilities of operating in essence continuously where a substantial continuous determination of concentration is provided by the sensor 6 and the specific agent substantially continuously is trained and determines an amount to be dosed, it has been found that it can be more effective to abate sulphide if the determined concentration of sulphide is determined at preselected points in time, such as at regular intervals, such as with a time interval of 15.0 seconds, such as 1.0 minutes, preferably 1.0 minutes, such as 20.0 minutes. The regular intervals for abatement of sulphide may, in an embodiment, be the same as intervals used in the previous section for determining the concentration of the sulphide.

Although the method of the invention can be used intermittently, that is turned off and on intermittently, it is often preferred that the reinforcement learning of the specific trained agent C is applied while the specific wastewater network is in service.

The general agent as disclosed, is in some embodiments trained based on numerical simulations. Such numerical simulations may often reside in a generic wastewater network e.g. characterized by different characteristic volume flows of wastewater, with different load and simulated state in response to simulated dosing of chemicals. While this provides a useable general agent, the general agent may before being deployed be further trained on the basis of simulations on at least some characteristics of the specific wastewater network 1. Such characteristics of the specific wastewater network 1 may include geometries of the networks system 1, expected timewise load exposure, expected quality, such as sewage water's potential to produce H2S, expected rain. By this, the exploration time for specific agent may be made even shorter which has the benefit of an efficient abatement of sulphide may be established faster. Such a further training is typically also performed by reinforcement learning as used otherwise for the general agent.

In some preferred embodiments, the general agent A and the specific agent B use a policy, for determining the best action given the state of the system and its surroundings, trained on Q learning, deep Q learning, model-based algorithms, actor-critique algorithm, federated learning or transfer_learning the state of the system being e.g. the H2S concentration history and flow history of the system, the time of the week, the rain in the area, the temperature of the waste water.

In some preferred embodiments, the pre-selected level of sulphide concentration is selected as a concentration interval, such as 5.0±0.1 ppm, preferably 4.0±0.1 ppm, such as 3.0±0.1 ppm, and where in the reinforcement learning comprising providing the specific agent C with a negative reward if a determined concentration of sulphide is outside the concentration interval.

In some preferred embodiments, the pre-selected level of sulphide concentration is selected a concentration value, such as 5.0 ppm, preferably 4.0 ppm, such as 3.0 ppm, and where in the reinforcement learning comprising providing the specific agent C with a negative reward if a determined concentration of sulphide is larger or smaller than the concentration value.

A method according to the present invention, wherein the pre-selected level of sulphide concentration is determined based on an estimated cost of dosing iron and estimated maintenance cost for the wastewater network as function of sulphide concentration.

While many different chemical may be used to abate formation or presence of sulphide, the chemical dosed is in many preferred embodiments, iron in one of its common oxidation states, such as $Fe^{2+}$, $Fe^{3+}$ and/or $Fe^{6+}$, or $NO_3$.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

H2S and sulphide are used interchangeably herein.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

1 Wastewater network
2 Pumping main
3 Waste water pump
4 Downstream manhole such as a pumping pit
5 Sensor
6 Dosing unit
7 Control unit
8 Side branch
9 Upstream manhole such as a pumping pit
10 Dosing pump
11 Control connection to waste water pump 3
12 Control connection to dosing unit 6
13 Data connection from sensor 5
14 Inlet to manhole or pumping pit 9
16 Outlet from downstream manhole Itemized List of Preferred Embodiments Item 1. A method for abating the presence of sulphide (H2S(g), H2S(aq) or HS-(aq)) in a wastewater flowing in a specific wastewater network (1) from an upstream pumping pit (9) to a downstream pumping pit or manhole (4), the method comprising
  dosing into the wastewater at a position upstream of the downstream pit or manhole (4) a chemical for abatement of H2S,
  determining by use of a sensor (5) the concentration of sulphide at a position downstream of the position at which chemical is dosed into the wastewater, such as located in the downstream manhole (4);
  wherein the amount of chemical dosed is determined by
    training a general agent by reinforcement learning (A), to determine a dosing amount of chemical on the basis of a concentration of sulphide, the training of the general agent (A) is based on numerical simulations of a plurality of wastewater networks resembling real wastewater networks, and/or:
    training the/a general agent (A) by reinforcement learning (B), on a numerical simulation of a specific wastewater network to determine a dosing amount of chemical on the basis of a concentration of sulphide;
    deploying the general agent (A or B) to determine amounts of chemical to be dosed into said specific wastewater network (1) and dosing the determined amounts of chemical into the specific wastewater network (1), wherein the deployment and dosing comprising
      training by reinforcement learning the general agent (A, B), to obtain a specific trained agent (C), wherein the reinforcement learning comprising:
        initially, determining by use of the general agent (A, B) an amount of chemical to be dosed on the basis of determined concentration of sulphide in the specific wastewater network (1) and dosing the determined amount into the wastewater,
        subsequently, establishing the specific trained agent (C) by determining the concentration of sulphide in the specific wastewater system and provide a reinforcement learning initially on the general trained agent (A, B) and subsequently to the specific trained agent (C).

Item 2. A method according to item 1, wherein the reinforcement learning comprises a reinforcement learning reward, preferably based on the negative absolute difference between a pre-selected level of sulphide concentration and an actual determination of sulphide concentration or based on the negative sum of estimated cost of H2S and the estimated cost of chemical.

Item 3. A method according to item 1 or 2, wherein the numerical simulation of a wastewater network system(s) is/are based on the basis of a plurality of data sets from real dosing scenario(s) from wastewater network system(s).

Item 4. A method according to any of the preceding items, wherein the determined concentration of sulphide is a value timely averaged over a preselected time, such as over 5.0 minutes, such as over 10.0 minutes.

Item 5. A method according any of the preceding items, wherein the determined concentration of sulphide is determined at preselected points in time, such as at regular intervals.

Item 6. A method according to any of the preceding items, wherein the reinforcement learning of the specific trained agent (C) is applied while the specific wastewater network is in service.

Item 7. A method according to any of the preceding items, wherein the general agent (B) is trained on the basis of simulations on at least some characteristics of the specific wastewater network (1), wherein the characteristics includes one or more of geometries of the networks system (1), expected timewise load exposure, expected quality, expected rain, specific information, such as houses connected, number of dimension, and policy from agents acting in other wastewater networks system(s).

Item 8. A method according to any of the preceding items, wherein the training comprising reinforcement learning.

Item 9. A method according to any of the preceding items, wherein the general agent (A, B) and the specific agent (C) use a policy, for determining the best action given the state of the system and its surroundings, trained on Q learning, deep Q learning, model-based algorithms, actor-critique algorithm, federated learning or transfer_learning the state of the system being e.g. the H2S concentration history and flow history of the system, the time of the week, the rain in the area, the temperature of the waste water.

Item 10. A method according to any of the preceding items, wherein the pre-selected level of sulphide concentration is a concentration interval, such as 5.0±0.1 ppm, preferably 4.0±0.1 ppm, such as 3.0±0.1 ppm, and where in the reinforcement learning comprising providing the specific agent (C) with a negative reward if a determined concentration of sulphide is outside the concentration interval.

Item 11. A method according to any of the preceding items, wherein the pre-selected level of sulphide concentration is a concentration value, such as 5.0 ppm, preferably 4.0 ppm, such as 3.0 ppm, and where in the reinforcement learning comprising providing the specific agent (C) with a negative reward if a determined concentration of sulphide is larger or smaller than the concentration value.

Item 12. A method according to any of the preceding items, wherein the chemical dosed is iron in one of its common oxidation states, such as $Fe^{2+}$, $Fe^{3+}$ and/or $Fe^{6+}$, or $NO_3$.

Item 13. A system for abating the presence of sulphide (H2S(g), H2S(aq) or HS-(aq)) in a wastewater flowing in a specific wastewater network (1) from an upstream pumping pit (9) to a downstream pumping pit or manhole (4), the system comprising
    an upstream manhole (9) having an inlet (14) for receiving wastewater,
    a downstream manhole (14) having an outlet (16) for discharging wastewater,
    a pumping main (2) fluidicly connecting the upstream pumping pit (9) with the downstream pumping pit or manhole (4),
    a pump (3) arranged to pump wastewater from the upstream manhole (9) to the downstream pumping pit or manhole (4) through the pumping main (2), said pump (3) is configured to pump in response to receiving a pump control signal,
    a dosing unit (6) configured for dosing chemical into pumping main (2) upstream of the downstream pumping pit or manhole (4), said dosing unit (6) is configured to dose a specific amount in response to receiving a dosing control signal,
    a sensor (5) arranged downstream of the position at which chemical is dosed into the wastewater, such as located in the downstream pumping pit or manhole (4), said sensor provides a readout indicative of the sulphide concentration in a region surrounding the sensor (5),
    a control unit (7) configured for providing the pump (3) with a pump control signal, providing the dosing unit (6) with a dosing control signal, and for receiving as input the readout from the sensor (5), said control unit (7) is further configured to establishing and execute the specific trained agent (C) according to any of the preceding items.

Item 14. A method for abating the presence of sulphide (H2S(g), H2S(aq) or HS-(aq)) in a wastewater flowing in a specific wastewater network (1) from an upstream pumping pit (9) to a downstream pumping pit or manhole (4), the method comprising
    dosing into the wastewater at a position upstream of the downstream pit or manhole (4) a chemical for abatement of H2S,
    determining by use of a sensor (5) the concentration of sulphide at a position downstream of the position at which chemical is dosed into the wastewater, such as located in the downstream manhole (4);
    wherein the amount of chemical dosed is determined by deploying a general agent (A or B) to determine amounts of chemical to be dosed into said specific wastewater network (1) and dosing the determined amounts of chemical into the specific wastewater network (1), wherein the deployment and dosing comprising
        training by reinforcement learning the general agent (A, B), to obtain a specific trained agent (C), wherein the reinforcement learning comprising:
            initially, determining by use of the general agent (A, B) an amount of chemical to be dosed on the basis of determined concentration of sulphide in the specific wastewater network (1) and dosing the determined amount into the wastewater, subsequently, establishing the specific trained agent (C) by determining the concentration of sulphide in the specific wastewater system and provide a reinforcement learning initially on the general trained agent (A, B) and subsequently to the specific trained agent (C).

Item 15. A method according to item 14, wherein the general agent is provided by:
    training a general agent by reinforcement learning (A), to determine a dosing amount of chemical on the basis of a concentration of sulphide, the training of the general agent (A) is based on numerical simulations of a plurality of wastewater networks resembling real wastewater networks, and/or:
    training the/a general agent (A) by reinforcement learning (B), on a numerical simulation of a specific wastewater network to determine a dosing amount of chemical on the basis of a concentration of sulphide.

Item 16. A method for abating the presence of sulphide (H2S(g), H2S(aq) or HS-(aq)) in a wastewater flowing in a specific wastewater network (1) from an upstream pumping pit (9) to a downstream pumping pit or manhole (4), the method comprising
    dosing into the wastewater at a position upstream of the downstream pit or manhole (4) a chemical for abatement of H2S,
    determining by use of a sensor (5) the concentration of sulphide at a position downstream of the position at which chemical is dosed into the wastewater, such as located in the downstream manhole (4);
    wherein the amount of chemical dosed is determined by inputting the determined concentration of sulphide into a specific agent whereby the specific agent provides an amount of chemical to the be dosed and dosing said amount into the wastewater network.

Item 17. A method according to item 16, wherein the specific agent is provided by training a general agent before being deployed on a specific wastewater network.

Item 18. A method according to item 17, wherein specific agent is trained by being deployed on said specific wastewater network(s).

Item 19. A method according to any of items 16-18, wherein the specific agent is according to any of the preceding items 1 to 13.

The invention claimed is:
1. A computer-implemented method for abating the presence of sulphide (H2S(g), H2S(aq) or HS-(aq)) in a wastewater flowing in a specific wastewater network from an upstream pumping pit to a downstream pumping pit or manhole wherein the specific wastewater network being an existing or planned physical realization of a wastewater network, the method comprising:

providing the specific wastewater network comprising the upstream pit and the downstream pit or manhole;

providing a dosing unit configured for dosing a chemical capable of sulphide abatement upstream of the downstream pit or manhole;

providing a sensor downstream of the dosing unit, said sensor being capable of measure concentration of sulphide and provide a readout indicative of the sulphide concentration in a region surrounding the sensor;

providing a control unit configured for providing the dosing unit with a dosing signal and for receiving as input the readout from the sensor;

dosing into the wastewater at a position upstream of the downstream pit or manhole said chemical for abatement of sulphide; and determining by use of the sensor the concentration of sulphide at a position downstream of the position at which chemical is dosed into the wastewater;

wherein the amount dosed of said chemical for abatement of sulphide is determined by providing a general agent being a software implement algorithm and at least one of:

training the general agent by reinforcement learning (A), to determine a dosing amount of chemical for abatement of $H_2S$ on the basis of a concentration of sulphide, the training of the general agent (A) is based on numerical simulations of a plurality of real wastewater networks;

training the general agent (A) by reinforcement learning (B), on a numerical simulation of the specific wastewater network to determine a dosing amount of chemical for abatement of $H_2S$ on the basis of a concentration of sulphide;

training the general agent by reinforcement learning (B), on a numerical simulation of another specific wastewater network to determine a dosing amount of chemical for abatement of $H_2S$ on the basis of a concentration of sulphide;

deploying the general agent (A or B) to determine amounts of said chemical for abatement of sulphide to be dosed into said specific wastewater network and dosing the determined amounts of chemical into the specific wastewater network by the dosing unit, wherein the deployment and dosing comprises:

training by reinforcement learning the general agent (A, B), to obtain a specific trained agent (C), the specific trained agent (C) being a computer implemented algorithm, wherein the reinforcement learning comprises:

initially, determining by use of the general agent (A, B) an amount of said chemical for abatement of sulphide to be dosed by the dosing unit on the basis of a determined concentration of sulphide in the specific wastewater network by the sensor, dosing the determined amount into the wastewater by the dosing unit, and after dosing of said chemical determining the concentration of sulphide in the specific wastewater system by the sensor and further train the general agent (A, B) to obtain the specific trained agent (C);

subsequently determining by use of the specific trained agent (C) an amount of said chemical for abatement of sulphide to be dosed on the basis of a determined concentration of sulphide in the specific wastewater network, dosing the determined amount into the wastewater by the dosing unit, and after dosing said chemical determining the concentration of sulphide in the specific wastewater system by the sensor and further train the specific trained agent (C).

2. A method according to claim 1, wherein the further training the specific agent comprising an exploratory element, where the specific agent comprising the exploratory element executes a different amount of dosing of chemical to abate sulphide than what would have been determined by the specific agent without the exploratory element.

3. A method according to claim 1, wherein training the general agent comprising an exploratory element, where the general agent comprising the exploratory element executes a different amount of dosing of chemical to abate sulphide than what would have been determined by the general agent without the exploratory element.

4. A method according to claim 1, wherein the reinforcement learning comprises a reinforcement learning reward.

5. A method according to claim 1, wherein the reinforcement learning is implemented as a reinforcement learning reward routine based on the negative absolute difference between a pre-selected level of sulphide concentration and an actual determination of sulphide concentration.

6. A method according to claim 1, wherein the numerical simulation of a wastewater network system(s) is/are based on the basis of a plurality of data sets from real dosing scenario(s) from wastewater network system(s).

7. A method according to claim 1, wherein the determined concentration of sulphide is a value timely averaged over a preselected time.

8. A method according to claim 1, wherein the determined concentration of sulphide is determined at preselected points in time.

9. A method according to claim 1, wherein the general agent (B) is trained on the basis of simulations on at least some characteristics of the specific wastewater network, wherein the characteristics includes one or more of geometries of the specific network system, expected timewise load exposure, expected quality, expected rain, specific information including houses connected, number of dimension, and policy from agents acting in other wastewater network system(s).

10. A method according to claim 1, wherein the general agent (A, B) and the specific agent (C) use a policy, for determining the best action given the state of the system and its surroundings, trained on Q learning, deep Q learning, model-based algorithms, actor-critique algorithm, federated learning or transfer_learning the state of the system being e.g. the sulphide concentration history and flow history of the system, the time of the week, the rain in the area, the temperature of the waste water.

11. A method according to claim 1, wherein the preselected level of sulphide concentration is a concentration interval, and where in the reinforcement learning comprising providing the specific agent (C) with a negative reward if a determined concentration of sulphide is outside the concentration interval.

12. A method according to claim 1, wherein the preselected level of sulphide concentration is a concentration value, and where in the reinforcement learning comprising providing the specific agent (C) with a negative reward if a determined concentration of sulphide is larger or smaller than the concentration value.

13. A method according to claim 1, wherein the chemical dosed for abatement of sulphide is iron in one of its common oxidation states.

14. A method according to claim 1, wherein the specific wastewater network further comprising:
- an inlet for receiving wastewater provided in the upstream pumping pit;
- an outlet for discharging wastewater provided in the downstream pumping pit or manhole;
- a pumping main fluidicly connecting the upstream pumping pit with the downstream pumping pit or manhole;
- a pump arranged to pump wastewater from the upstream pumping pit to the downstream pumping pit or manhole through the pumping main, said pump being configured to pump in response to receiving a pump control signal, and wherein:
- said sensor is arranged downstream of the position at which chemical is dosed into the wastewater, said sensor providing a readout indicative of the sulphide concentration in a region surrounding the sensor.

15. A system for abating the presence of sulphide ($H_2S$ (g), $H_2S$(aq) or $HS^-$(aq)) in a wastewater flowing in a specific wastewater network from an upstream pumping pit to a downstream pumping pit or manhole, the system comprising:
- an upstream manhole having an inlet for receiving wastewater;
- a downstream manhole having an outlet for discharging wastewater;
- a pumping main fluidicly connecting the upstream pumping pit with the downstream pumping pit or manhole;
- a pump arranged to pump wastewater from the upstream manhole to the downstream pumping pit or manhole through the pumping main, said pump being configured to pump in response to receiving a pump control signal;
- a dosing unit configured for dosing chemical into pumping main upstream of the downstream pumping pit or manhole, said dosing unit being configured to dose a specific amount in response to receiving a dosing control signal;
- a sensor arranged downstream of the position at which chemical is dosed into the wastewater, said sensor provides a readout indicative of the sulphide concentration in a region surrounding the sensor,
- a control unit configured for providing the pump with a pump control signal, providing the dosing unit with a dosing control signal, and for receiving as input the readout from the sensor, said control unit being further configured to establishing and execute a specific trained agent (C), the specific trained agent being obtained by training a general agent (A, B) by reinforcement learning, wherein the reinforcement learning comprises initially, determining by use of the general agent (A, B) an amount of chemical for abatement of sulphide to be dosed by the dosing unit on the basis of a determined concentration of sulphide in the specific wastewater network by the sensor, dosing the determined amount into the wastewater by the dosing unit, and after dosing of the chemical determining the concentration of sulphide in the specific wastewater system by the sensor.

16. A method according to claim 4, wherein the reinforcement learning reward is based on a negative absolute difference between a pre-selected level of sulphide concentration and an actual determination of sulphide concentration or based on a negative sum of estimated cost of sulphide and an estimated cost of chemical.

* * * * *